United States Patent
Opstad et al.

(10) Patent No.: US 7,379,075 B2
(45) Date of Patent: May 27, 2008

(54) METHOD AND SYSTEM FOR THE REPRESENTATION OF COLOR AND OTHER ATTRIBUTES IN BITMAP FONTS

(75) Inventors: David G. Opstad, Mountain View, CA (US); Alexander B. Beaman, San Jose, CA (US)

(73) Assignee: Apple Inc., Cupertino, CA (US)

( * ) Notice: Subject to any disclaimer, the term of this patent is extended or adjusted under 35 U.S.C. 154(b) by 85 days.

(21) Appl. No.: 10/885,838

(22) Filed: Jul. 8, 2004

(65) Prior Publication Data

US 2004/0246254 A1    Dec. 9, 2004

Related U.S. Application Data

(63) Continuation of application No. 09/430,134, filed on Oct. 29, 1999, now Pat. No. 6,762,770.

(51) Int. Cl.
*G06T 11/00* (2006.01)
*G09G 5/02* (2006.01)

(52) U.S. Cl. ........................... 345/601; 345/467

(58) Field of Classification Search ............... 345/601, 345/602
See application file for complete search history.

(56) References Cited

U.S. PATENT DOCUMENTS

| | | | |
|---|---|---|---|
| 4,847,604 A | 7/1989 | Doyle | |
| 5,159,320 A | 10/1992 | Matsuo et al. | |
| 5,321,810 A | 6/1994 | Case et al. | |
| 5,416,898 A | 5/1995 | Opstad et al. | |
| 5,430,465 A | 7/1995 | Sabella et al. | |
| 5,446,837 A | 8/1995 | Motoyama et al. | |
| 5,475,400 A | 12/1995 | Sellers et al. | |
| 5,568,167 A | 10/1996 | Galbi et al. | |
| 5,613,090 A * | 3/1997 | Willems | 719/329 |
| 5,751,590 A | 5/1998 | Cannon et al. | |
| 5,771,034 A | 6/1998 | Gibson | |
| 5,784,055 A | 7/1998 | Ngai | |
| 5,801,650 A * | 9/1998 | Nakayama | 341/67 |
| 5,918,238 A | 6/1999 | Hayashi | |
| 5,963,206 A | 10/1999 | Ulrich et al. | |
| 6,014,133 A | 1/2000 | Yamakado et al. | |
| 6,016,360 A | 1/2000 | Nguyen et al. | |
| 6,057,858 A | 5/2000 | Desrosiers | |
| 6,073,147 A | 6/2000 | Chan et al. | |
| 6,075,514 A | 6/2000 | Ryan | |
| 6,229,521 B1 | 5/2001 | Yip | |
| 6,288,726 B1 | 9/2001 | Ballard | |

(Continued)

*Primary Examiner*—Kee M. Tung
*Assistant Examiner*—Michelle K Lay
(74) *Attorney, Agent, or Firm*—Buchanan Ingersoll & Rooney PC

(57) ABSTRACT

Colors are specified within the individual glyphs of a font by means of an indirect approach which employs multiple tables. The data values for individual pixels of a glyph identify entries in an index table, which pertains to a subset of all available colors. The entries in the index table map to a complete set of colors that are specified in a color table. As a result of this structure, the amount of data that is required to specify the individual pixels of a glyph can be minimized to the number of bits required to distinguish the colors within that glyph. The specification of all available colors within a single table permits that table to be shared among various resources, including bitmap fonts and outline fonts.

9 Claims, 3 Drawing Sheets

U.S. PATENT DOCUMENTS 6,342,896 B1  1/2002  Shetter et al.
6,360,023 B1  3/2002  Betrisey et al.

2002/0130871 A1*  9/2002  Hill et al. .................. 345/467

* cited by examiner

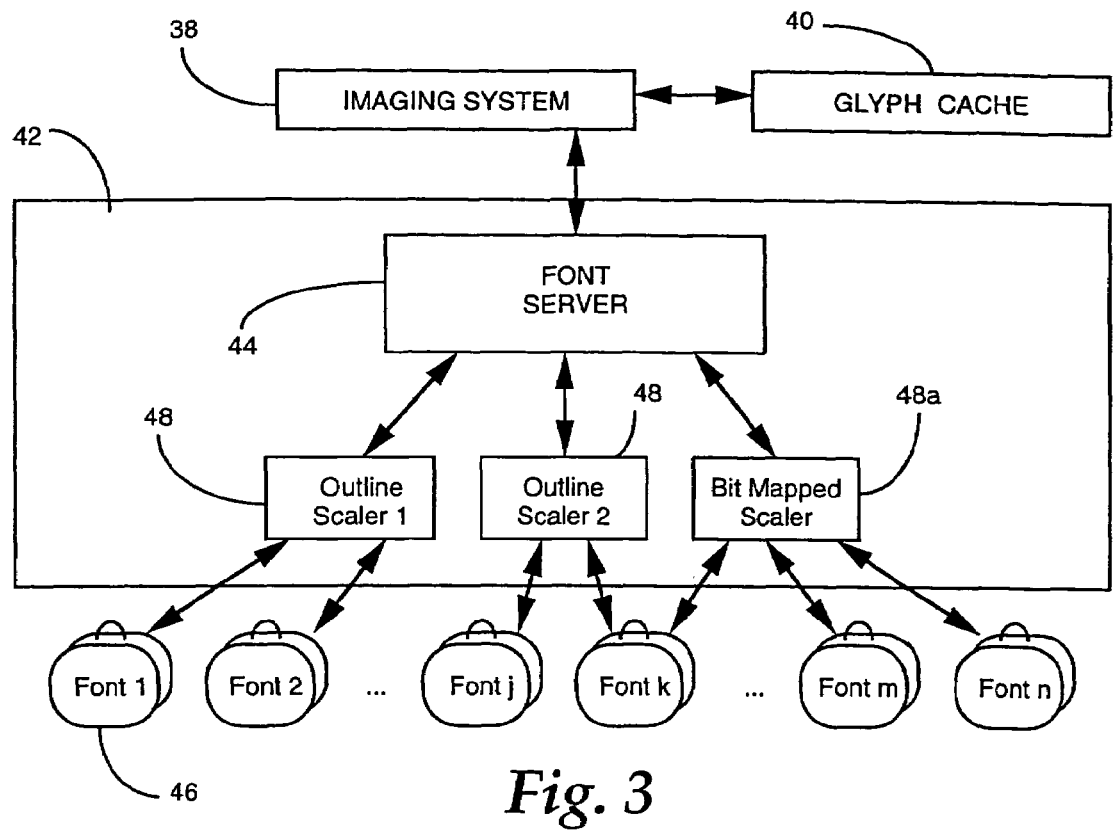
Fig. 3
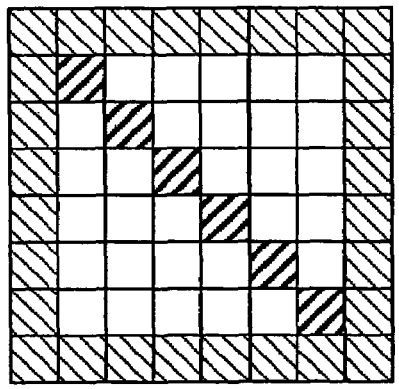
Fig. 4
| 10 | 10 | 10 | 10 | 10 | 10 | 10 | 10 |
|---|---|---|---|---|---|---|---|
| 10 | 01 | 00 | 00 | 00 | 00 | 00 | 10 |
| 10 | 00 | 01 | 00 | 00 | 00 | 00 | 10 |
| 10 | 00 | 00 | 01 | 00 | 00 | 00 | 10 |
| 10 | 00 | 00 | 00 | 01 | 00 | 00 | 10 |
| 10 | 00 | 00 | 00 | 00 | 01 | 00 | 10 |
| 10 | 00 | 00 | 00 | 00 | 00 | 01 | 10 |
| 10 | 10 | 10 | 10 | 10 | 10 | 10 | 10 |
Fig. 5

METHOD AND SYSTEM FOR THE REPRESENTATION OF COLOR AND OTHER ATTRIBUTES IN BITMAP FONTS

FIELD OF THE INVENTION

The present invention relates to the display and printing of font characters, and more particularly to a method and system for representing color and/or other attributes as components of the bitmap glyph images that characterize a font.

BACKGROUND OF THE INVENTION

Many different types of computer application programs, such as desktop publishing programs, word processing programs, graphic design programs, and web page authoring programs, provide the capability for users to display text in a number of different manners, to provide a variety of different effects. For instance, users can control the appearance of the text by selecting different fonts, as well as various characteristics of the text, including its size, style, weight and the like. Many of these characteristics are included within the definition of a font. For instance, a font might contain one set of character images, or glyphs, for plain text, another set of glyphs for bold text, and yet another set of glyphs for italicized text.

Another attribute of text, which can be employed with great effectiveness to create different impressions, is its color. For instance, individual words in a document can be printed in bold colors, such as red or blue, to draw the reader's attention to a specific concept. In another context, a variety of colors can be used for different portions of text, to create fanciful presentations. In the past, color did not form a component of a font definition itself. Rather, the individual glyphs of a font were defined as monochrome images. For instance, one approach that is employed to define glyph images employs a bitmap of the image. In this approach, each pixel of an image is defined as being "on" or "off". When the image of a character is to be displayed on a computer monitor or printed on paper, the "on" pixels are displayed or printed with a designated foreground color, e.g. black, and the "off" pixels are not printed, or are displayed as a background color, to thereby form the image of a character. To change the color of the character, the designated foreground color is varied. Thus, for example, if the new foreground color is designated as red, the entire character appears in the color red, rather than black.

An alternative approach to defining the glyphs of a font is to characterize them by their geometric shapes. In this approach, the outline of the font is defined, for example by mathematical formulas. When the character is to be displayed, the area within the defined outline is filled with the foreground color. In a similar manner, the color of the character can be changed, by designating a different foreground color.

To provide greater versatility in the appearance of glyphs, it is desirable to employ multiple colors within the image of a single character or symbol. For example, it may be desirable to display one or more edges of a character in a color that contrasts with the main color of the character, to create a shadow effect. In another situation, it may be desirable to display or print a glyph in a pattern of colors that represent the colors of a country's flag, or other symbolic image. One technique that permits the glyphs of an outline font to be displayed with multiple colors is disclosed in copending application Ser. No. 6,091,505, commonly assigned herewith. In the technique disclosed therein, different components of the outline can be defined in respective layers, and each layer can be displayed in a different color.

For bitmapped fonts, it is possible to designate different colors by employing multiple bits for each pixel of the glyph image. However, such an approach can significantly increase the amount of data that is required to define the font. For instance, in a system which is capable of displaying up to 256 different colors, 8 bits are required to uniquely designate any given color. It will be appreciated that, if 8 bits are required to define each pixel within each glyph of the font, the amount of memory required to store the font will become excessive.

Accordingly, it is desirable to provide a technique which permits colors and other multi-valued attributes of glyphs to be defined within bitmapped font images, but which does so with a limited amount of data, to thereby minimize storage requirements.

BRIEF DESCRIPTION OF THE INVENTION

In accordance with the present invention, colors and other multi-valued attributes are specified within the individual glyphs of a font through an indirect approach, to thereby permit each glyph to be defined with a limited amount of data. This indirect approach is implemented through the use of multiple tables. The data values for the individual pixels of a glyph identify entries in an index table that is associated with one or more glyphs. The entries in the index table map to a table which is universal to all of the glyphs and contains all of the values of a particular attribute of the glyphs. If the attribute is color, the table contains entries which respectively correspond to all of the colors that are employed within the font.

By means of this approach, the amount of data that is required for any particular glyph can be minimized. For example, if a glyph contains a maximum of four colors, each pixel of the glyph only requires two bits to define its color. Another glyph which employs a different set of four colors also can be defined with two bits per pixel. The index tables specify the mapping of the two-bit pixel values for the individual glyphs to the various colors specified in the universal color table. Hence, even if the color table specifies a total of 256 different colors, each glyph only requires two bits per pixel, rather than eight bits per pixel, thereby keeping the size of the font data to a minimum.

Furthermore, each index table only needs to be large enough to accommodate an arbitrary number of colors, rather than being confined to a number of entries which are equal to a power of two. This flexibility in the size of the index table further permits the amount of font data to be kept to a minimum.

As an additional advantage of the invention, the color table can define the colors in a device-independent manner. As a result, the color table can be shared between outline fonts and bitmapped fonts, rather than being limited solely to use by a bitmapped font.

Further features of the invention, and the advantages provided thereby, are described in greater detail hereinafter with reference to embodiments thereof illustrated in the accompanying drawings.

BRIEF DESCRIPTION OF THE DRAWINGS

FIG. 3 is a more detailed view of the architecture of the font subsystem;

FIG. 4 is an example of an illustrative glyph image;

FIG. 5 illustrates an 8×8 bitmap for the glyph of FIG. 4; and

DETAILED DESCRIPTION

To facilitate an understanding of the present invention, it is described hereinafter with reference to the representation of color as component of the glyphs that characterize a font. It will be appreciated, however, that the invention is not limited to this particular attribute. Rather, the principles which underlie the invention can be used in conjunction with any attribute of a glyph that is capable of being expressed as a multi-bit value. For instance, it may be desirable to assign different levels of transparency to the individual pixels of a glyph. The techniques of the present invention can be employed to minimize the amount of data that is required to achieve such an effect.

Figure 1:
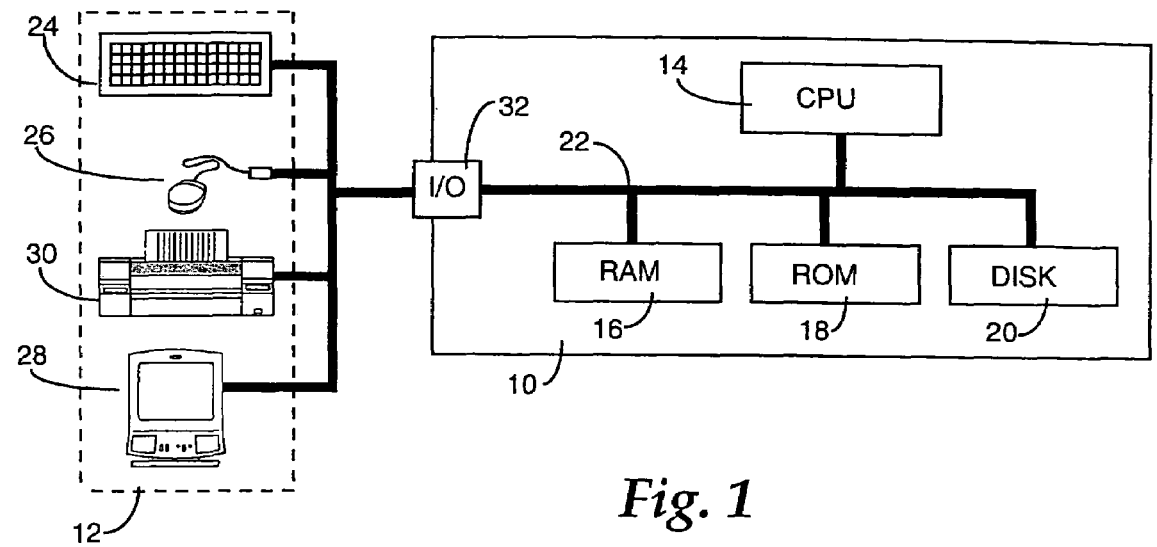
FIG. 1 is a general block diagram of the components of an exemplary computer system.

The present invention is broadly directed to the manner in which character images of a font are represented in a computer, for display on a display device, such as a monitor, and/or printing in a document. While the particular hardware components of a computer system do not form a part of the invention itself, they are briefly described herein to provide a thorough understanding of the manner in which the features of the invention cooperate with the components of a computer system to produce desired results. Referring to FIG. 1, a typical computer system includes a computer 10 having a variety of peripheral devices 12 connected thereto. The computer 10 includes a central processing unit 14 and associated memory. This memory generally includes a main working memory which is typically implemented in the form of a random access memory 16, a static memory that can comprise a read only memory 18, and a permanent storage device, such as a magnetic or optical disk 20. The CPU 14 communicates with each of these forms of memory through an internal bus 22. The peripheral devices 12 include a data entry device such as a keyboard 24, and a pointing or cursor control device 26 such as a mouse, trackball, pen or the like. A display device 28, such as a CRT monitor or a LCD screen, provides a visual display of the information that is being processed within the computer, for example the contents of a document or a computer generated image. A tangible copy of this information can be provided through a printer 30, or similar such device. Each of these external peripheral devices communicates with the CPU 14 by means of one or more input/output ports 32 on the computer.

A computer readable medium containing a computer program for assigning colors to a variety of glyphs is disclosed. The computer program comprises executable instructions for: defining colors in a single table; defining a glyph of a font by its elements, an element being either a pixel or a vector according to the font; and mapping each element of the glyph to a respective color of the single table using index values of an index table which is smaller than the single table, the single table being shared among various resources, including bitmap fonts and outline fonts, wherein each index value is of a bit length according to the size of the index table.

Figure 2:
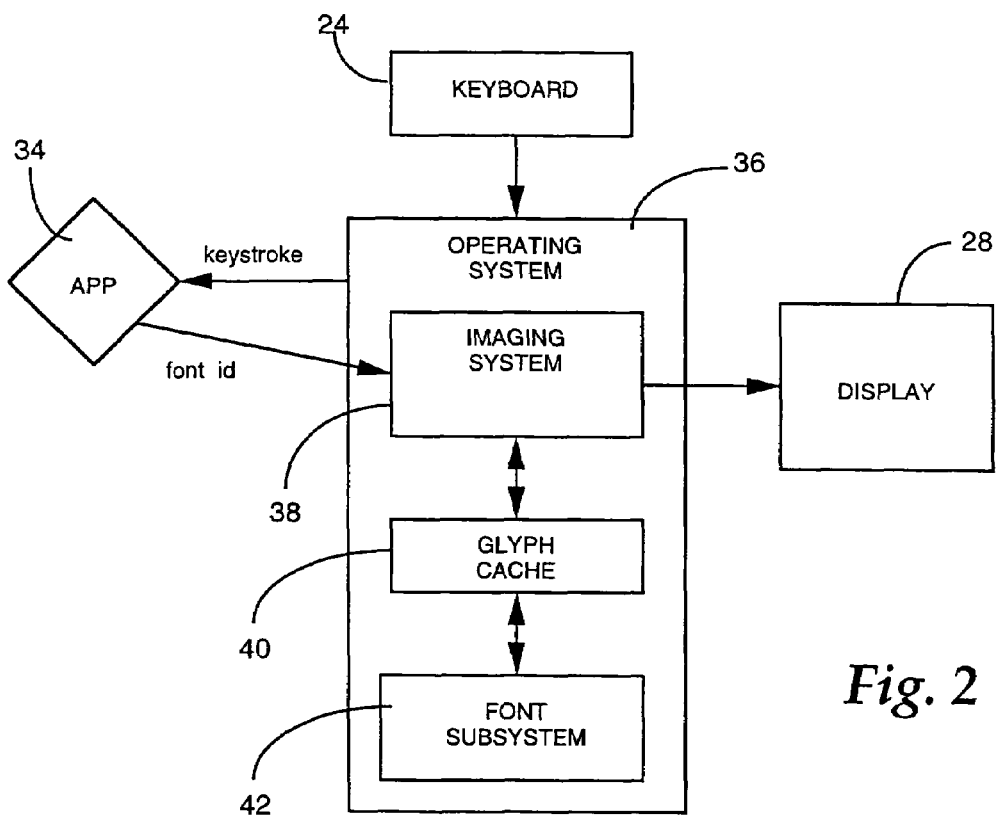
FIG. 2 is a block diagram illustrating the general architecture of software components involved in the implementation of the present invention.

The general architecture of software programs that are loaded into the RAM 16 and executed on the computer is illustrated in the block diagram of FIG. 2. In a typical situation, the user interacts with one or more application programs 34, such as a word processing program, a desktop publishing program, or a graphics program. In operation, as the user types words via the keyboard 24, the application program issues requests to the computer's operating system 36 to have the characters corresponding to the keystrokes drawn on the display 28. Similarly, when the user enters a command to print a document, the application program issues requests to the operating system which cause the corresponding characters to be printed via the printer 30. For illustrative purposes, the following description of the operation of the present invention will be provided for the example in which characters are drawn on the screen of the display 28 in response to user-entered keystrokes. It will be appreciated, however, that similar operations are carried out in connection with the printing of characters in a document on the printer 30.

When a user types a character via the keyboard 24, an indication of that event is provided to the application program 34 by the computer's operating system 36. In response, the application program issues a call to the computer's imaging system 38, to draw the character corresponding to the keystroke at a particular location on the display. That call includes a character code that designates a particular letter or other item of text, and style information which contains an identification of the font for the corresponding character. The imaging system 38 is a component of the computer's operating system 36. In the case of the Macintosh operating system, for example, the imaging system could be Quick-Draw.

Upon receipt of the request for a character in a particular font, the imaging system accesses a glyph cache 40, which contains bitmap images of characters. If the requested character has been previously displayed in the designated style, its image will be stored in the glyph cache, and immediately provided to the imaging system. If, however, the requested character is not stored in the cache, a call is made to a font subsystem 42, to obtain the requested image. The call to the font subsystem identifies a particular font object, a point size, a resolution and any possible variations.

The structure of the font subsystem is illustrated in FIG. 3. Within the font subsystem 42, the management of requested font objects is handled by a font server 44. In general, when a request for a font is received from an application program, for instance via the imaging system 38, the font server is responsible for locating the font or, if it is not available, the best substitute for it. The font server also retrieves the fonts that have been requested, and supplies them to the imaging system. The font server may also be responsible for displaying a font selection dialog box from which the user can choose a desired font, and/or providing a list of available fonts to the application program, to be displayed in a font menu.

Each font that is stored in the computer, for example on the hard disk 20, resides in a file that is sometimes referred to as a suitcase. FIG. 3 illustrates a number of suitcases 46 that respectively store fonts labeled 1 through n. Each suitcase contains all of the data tables and other associated information that forms the definition of a font.

Fonts can be classified according to different technologies. Some fonts are known as outline fonts, since their typeface designs, or glyphs, are specified by vectors which define the outlines of their shapes. Other types of fonts might fall into a category that is referred to as bitmapped, or screen fonts, in which each pixel of a glyph is defined. In some cases, a single font can contain both outlines and bitmaps, with respective tables directed to each type of data. Each of these technologies has a different set of rules for processing font data to satisfy a particular request. For instance, the images for bitmapped font characters may be stored on the computer for a particular point size, e.g., 12 point. If the user requests the characters to be displayed at a different size, the pixel data must be processed to rescale the images of the characters. This processing is carried out in a font scaler 48a. In general, the font scaler operates in accordance with a set of rules for interpreting and processing the stored font data so as to satisfy specific requests from the font server 44. Each different type of font technology has an associated scaler for processing the data of fonts which conform to that technology.

In operation, the application program 34 issues a request for a particular font object. The font object provides an identification of a glyph family, e.g. a particular character such as "lowercase a", as well as its desired line weight and stress. The request from the application program also identifies any style variations to be applied to the character, such as italic, bold, underline, superscript, and the like. Upon receiving the font object, the font server 44 determines the font technology with which that object is associated, and passes the request on to the appropriate scaler 48. The scaler retrieves the necessary data from the suitcase 46 associated with the identified font, and processes it to meet the parameters specified in the request. The scaler then returns a glyph image to the font server 44, which is provided to the imaging system 38 and stored in the glyph cache 40.

As noted previously, each font is defined within its respective suitcase by means of various data tables that are stored in the memory of the computer system. For bitmapped fonts, one of these tables comprises a bitmap which defines the values of the individual pixels within the glyph images. FIG. 4 illustrates an example of an image comprised of an 8×8 array of pixels. This image employs three colors. The background color is represented by the empty cells of the bitmap. Two different foreground colors are respectively represented by the different types of shading within the cells.

The three colors of the glyph can be represented with two-bit binary values. FIG. 5 illustrates two-bit values that correspond to each of the pixels in the bitmap of FIG. 4. In accordance with the present invention, these two-bit values are not directly representative of the actual colors which form the glyph image. If they were, all of the glyphs in the font would be limited to using a maximum of four colors. In accordance with the invention, a data structure in which the color specification is separate from the bit map enables a much greater number of colors can be employed for a limited number of bits per pixel. One set of tables in the data structure are known as color index tables, and each defines a subset of the available colors of the font. These index tables map to a color table which is universal to all of the glyphs and specifies all of the colors that are available for the various glyphs of the font.

Figure 6:
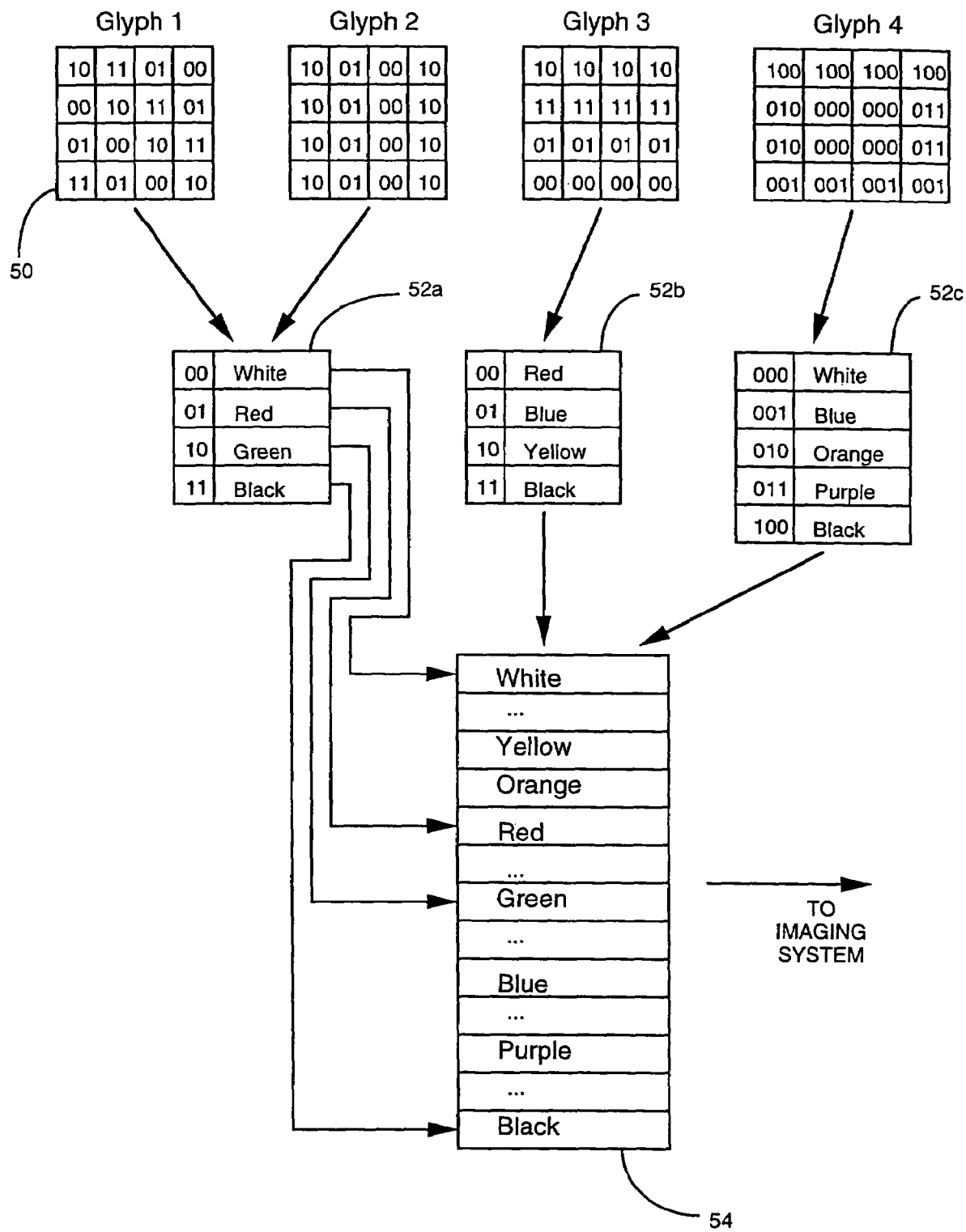
FIG. 6 is a schematic representation of the relationship of the various tables that are used to specify colors within a glyph image.

FIG. 6 schematically illustrates the relationship of these various tables to one another within the data structure. The image data for the individual glyphs of a font is contained in respective bitmap tables 50. The example of FIG. 6 illustrates bitmaps for four glyphs labeled 1-4. The first glyph contains four colors, e.g. white, red, green and black, and is therefore represented by 2 bits per pixel. The second glyph contains 3 of these same 4 colors, e.g. white, red and green, and is also represented by 2 bits per pixel. These 2 glyphs are associated with an index table 52a which maps the 2-bit data values within the bitmaps 50 to corresponding color specifications within a color table 54.

The third glyph also contains 4 colors, and is therefore represented by 2-bits per pixel. However, the subset of four colors contained within this glyph is different from the colors employed in Glyphs 1 and 2. Accordingly, the bitmap 50 for the third glyph is associated with a different index table 52b. This table maps the 2-bit values of Glyph 3 to a different subset of 4 colors within the color table 54.

The fourth glyph is comprised of 5 colors, and therefore 3-bits of data are required to uniquely identify the color for each pixel. This glyph is associated with another index table 52c, which maps the 3-bit-pixel values of the glyph to the appropriate colors within the color table 54.

When the glyph is to be displayed, the appropriate colors are retrieved from the specifications in the color table 54, and provided to the imaging system 38 for each of the pixels in the image.

As a result of this arrangement, each bitmap 50 only requires the number of bits per pixel that are needed to distinguish the colors for its glyph, rather than the number of bits necessary to differentiate all possible colors. In a computer system which employs 8-bit color designations, for example, up to 256 different colors can be displayed. However, the bitmap for an individual glyph only needs to differentiate among its particular colors, rather than all 256 possible colors. Consequently, the amount of data that is required to define the glyphs of the font can be kept to a minimum.

Furthermore, the specification of all of the colors in a single table 54, rather than within the bitmaps for the individual glyphs, offers additional advantages. Preferably, colors are specified in a font in a device-independent manner, and then converted into the appropriate device-dependent colors when they are to be printed or displayed. The conversion from device-independent to device-dependent color can take place within the imaging system 38. By specifying all of the colors in a single table 54 in accordance with the invention, the conversion to device-dependent color only has to occur one time, when the font is first called. Conversely, if the colors were to be directly specified within each bitmap, the conversion to device-dependent color would have to occur each time a glyph is called that contains a color different from those used previously. Hence, the arrangement of the present invention results in more efficient operation of the imaging system.

Furthermore, by storing device-independent specifications for the colors in a separate table, the color data can be shared with outline glyphs as well, rather than be limited to use by the bitmapped glyphs. Thus, for example, if an outline glyph has multiple levels to facilitate printing in different colors, as described in U.S. Pat. No. 6,091,505, these levels can reference the table 54 to specify the particular colors to be displayed or printed.

In accordance with a further feature of the invention, the amount of data necessary to define the font is minimized by limiting the number of entries in each index table to the number of colors in the glyphs with which it is associated. With reference to FIG. 6, for example, 3-bit values are employed to index into the table 52*c*. Consequently, the table is capable of uniquely identifying 8 different colors. However, if only 5 of those colors are employed in the associated glyphs, the index table contains only 5 entries. Hence, memory space is not wasted by storing entries associated with 3 unused colors.

A specific example of an implementation of the foregoing concepts in the context of a TrueType font, using the C programming language, will now be described with reference to the exemplary glyph and bitmap of FIGS. 4 and 5. The definition of various data types, such as UInt8, UInt16, Fixed, etc. are not set forth, since they are common to known font definitions and therefore well-known. In a TrueType font, the bitmap data is contained within a table known as the 'bdat' table. To accommodate the features of the present invention, the 'bdat' table is defined by the following structure:

```
struct BDAT {                        // small metrics, byte-aligned compression
    UInt16            colorMapIndex;  // index of map in 'colr' table
    BDATSmallMetrics  smallMetrics;   // standard small metrics
    UInt8             pixelBitCount;  // number of bits per pixel
    (variable)        imageData;      // number rows start at byte
                                      //   boundaries
};
```

The colorMapIndex is an index into a map, or index table 52. The pixelBitCount is the smallest value that can accommodate the number of different colors in the glyph. It is not limited to being a power of two. In the actual image data, a pixel is defined by this number of bits.

While the index table 52 and the color table 54 have been schematically illustrated as separate tables in the diagram of FIG. 6, in practice they can be implemented within a single table. The format of this table can be as follows:

```
struct SFNT_colrtable {
// header
    Fixed      version;              // set to 0x00010000
    UInt32     format;               // format of map data (see enum
                                     //   listed below)
    UInt32     part2Offset;          // byte offset to 2nd part start
                                     //   (must be a multiple of 4)
// first part (maps from bitmap data to color index in second part)
    UInt32     numMaps;              // number of maps which follow
    UInt32     mapOffset [numMaps];  // to start of each map
    (variable)                 (map data)
// second part (actual device-independent color set)
    UInt32     numColors;
    UInt32     colorSpace;           // as defined in CMApplication.h
    SFNT_Color colors [numColors];   // the colors
};
```

In the first part of this table, the map data comprises an array of lookup values. The size of each value depends on the format of the table (as described in the format entry in the header). The format values are defined in the following enumeration:

```
enum {
    kFormat4ByteEntries   = 0,
    kFormat2ByteEntries   = 1,
    kFormat1ByteEntries   = 2
};
```

The structure of an SFNT_Color is defined as follows:

```
struct SFNT_Color {
    UInt16   flags;
    UInt16   alpha;    // only 8 bits used if CMColor components
                       //   are 8-bit
    CMColor  color;
};
```

Given these structures, the 'bdat' table for the example of FIG. 5 would appear as follows, where offsets are defined from the start of the table structure:

| Offset | Value | Interpretation |
|---|---|---|
| 0 | 1 | Index into the 'colr' table (see below) |
| 2 | (unused) | (Not relevant to color data) |
| 7 | 2 | Two bits are used for each pixel |
| 8 | 0xAA, 0xAA | First row of the image |
| 10 | 0x90, 0x02 | Second row of the image |
| 12 | 0x84, 0x02 | Third row of the image |
| 14 | 0x81, 0x02 | Fourth row of the image |
| 16 | 0x80, 0x42 | Fifth row of the image |
| 18 | 0x80, 0x12 | Sixth row of the image |

-continued

| Offset | Value | Interpretation |
| --- | --- | --- |
| 20 | 0x80, 0x06 | Seventh row of the image |
| 22 | 0xAA, 0xAA | Eighth row of the image |

The color table contains the following data. Although the foregoing example only refers to the entry at index 1, for purposes of completeness the entire table is described below:

| Offset | Value | Interpretation |
| --- | --- | --- |
| 0 | 0x00010000 | Fixed 1.0, specifying version |
| 4 | 2 | Format 2, meaning the map entries are bytes |
| 8 | 44 | Offset to start of second part of table (note this must be a multiple of 4, so there's a bit of padding after the maps) |
| 12 | 4 | Number of maps in this 'colr' table; these are indexed as 0 through 3 in various entries in the 'bdat' table (our example above uses index 1) |
| 16 | 32 | Offset from the start of the table to the first map (index 0) |
| 20 | 34 | Offset from the start of the table to the second map (index 1) |
| 24 | 37 | Offset from the start of the table to the third map (index 2) |
| 28 | 41 | Offset from the start of the table to the fourth map (index 3) |
| // The actual map data starts here | | |
| 32 | 0, 2 | First map, taking bit value 0 to color index 0; and bit value 1 to color index 2 |
| 34 | 0, 2, 4 | Second map, taking bit value 0 to color index 1; bit value 1 to color index 2; and bit value 2 to color index 4. |
| 37 | 0, 1, 2, 3 | Third map, taking bit value 0 to color index 0; bit value 1 to color index 1; bit value 2 to color index 2; and bit value 3 to color index 3 |
| 41 | 2, 0 | Fourth map, taking bit value 0 to color index 2; and bit value 1 to color index 0 |
| 43 | 0 | (padding for long alignment) |
| // The second part, containing the actual colors, starts here | | |
| 44 | 5 | Number of colors defined here |
| 48 | 1 | These colors are all in cmRGBSpace |
| // The array of SFNT_Colors starts here | | |
| 52 | 0, 0 | Flags and alpha for color 0 |
| 56 | 0x0000, 0x0000, 0x0000 | RGB color specification for black |
| 62 | 2, 0 | Flags and alpha for color 1 (2 means use background color) |
| 66 | 0xFFFF, 0xFFFF, 0xFFFF | RGB color specification for background white |
| 72 | 0, 0 | Flags and alpha for color 2 |
| 76 | 0x0000, 0xFFFF, 0x0000 | RGB color specification for green |
| 82 | 0, 0 | Flags and alpha for color 3 |
| 86 | 0x0000, 0x0000, 0xFFFF | RGB color specification for blue |
| 92 | 0, 0 | Flags and alpha for color 4 |
| 96 | 0xFFFF, 0x0000, 0x0000 | RGB color specification for red |

In the foregoing example, each specified color also has an associated flag and alpha value, which consist of 2 bits each. The flag specifies different options that can be employed when the color is to be displayed or printed. For instance, a flag value of 0 indicates that the actual color, as specified in the table, is to be used. A flag value of 1 indicates that the predefined foreground color is to be used in place of the specified color, whenever that color is called. A flag value of 2 indicates that the background color is to be used instead of the specified color. If desired, a flag value of 3 can be used to identify another substitute color to be employed. In effect, therefore, by offering the ability to substitute foreground and background colors for specified colors, the flags can operate as a form of alpha channel specification, by causing areas within a glyph to blend into the foreground or background of an image.

It will be appreciated by those of ordinary skill in the art that the present invention can be embodied in other specific forms without departing from the spirit or essential characteristics thereof. For example, while specific embodiments of the invention have been described in connection with the representation of color in a font, the principles of the invention can be employed to represent other attributes as well. For example, multi-bit transparency values, or alpha values, can also be represented within a font in the same manner. More generally, any type of multi-level attribute can be expressed in this fashion, where it is desirable to minimize the amount of data that is necessary to describe the attribute.

The presently disclosed embodiments are therefore considered in all respects to be illustrative, and not restrictive. The scope of the invention is indicated by the appended claims, rather than the foregoing description, and all changes that comes within the meaning and range of equivalence thereof are intended to be embraced therein.

What is claimed is:

1. A method of color assignment to a variety of glyphs, comprising the steps of:
   defining colors in a single table;
   defining a glyph of a font by its elements, an element being either a pixel or a vector according to the font; and
   mapping each element of the glyph to a respective color of the single table using index values of an index table which is smaller than the single table, the single table being shared among various resources, including bitmap fonts and outline fonts, wherein each index value is of a bit length according to the size of the index table.

2. The method according to claim 1, wherein the colors in the single table are device-independent.

3. The method according to claim 1, wherein the index table maps the elements to a subset of colors of the single table.

4. A computer readable medium containing a computer program for assigning colors to a variety of glyphs, wherein the computer program comprises executable instructions for:
   defining colors in a single table;
   defining a glyph of a font by its elements, an element being either a pixel or a vector according to the font; and
   mapping each element of the glyph to a respective color of the single table using index values of an index table which is smaller than the single table, the single table being shared among various resources, including bitmap fonts and outline fonts, wherein each index value is of a bit length according to the size of the index table.

5. The computer readable medium according to claim 4, wherein the colors in the single table are device-independent.

6. The computer readable medium according to claim 4, wherein the index table maps the elements to a subset of colors of the single table.

7. A device-independent system for assigning colors to a variety of glyphs, comprising:
   a single table defining a plurality of colors;
   a plurality of fonts having glyphs defined by elements, an element being either a pixel or a vector according to the font; and
   at least one index table of index values to map each element of the respective glyph to the respective color of the single table, an index table being smaller than the single table, the single table being shared among various resources, including bitmap fonts and outline fonts, wherein each index value is of a bit length according to the size of the index table.

8. The system according to claim 7, wherein the colors in the single table are device-independent.

9. The system according to claim 7, wherein the at least one index table maps the elements to a respective subset of colors of the single table.

* * * * *